US008830857B2

(12) United States Patent
Jun

(10) Patent No.: US 8,830,857 B2
(45) Date of Patent: Sep. 9, 2014

(54) NAME-TO-ADDRESS MAPPING SYSTEM, DATA TRANSMISSION METHOD AND NAME-TO-ADDRESS MAPPING MAINTENANCE METHOD

(75) Inventor: Wang Jun, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 240 days.

(21) Appl. No.: 13/393,461

(22) PCT Filed: Jun. 12, 2010

(86) PCT No.: PCT/CN2010/073874
§ 371 (c)(1),
(2), (4) Date: Feb. 29, 2012

(87) PCT Pub. No.: WO2011/029322
PCT Pub. Date: Mar. 17, 2011

(65) Prior Publication Data
US 2012/0163386 A1    Jun. 28, 2012

(30) Foreign Application Priority Data

Sep. 8, 2009    (CN) .......................... 2009 1 0169913

(51) Int. Cl.
*H04L 12/46*    (2006.01)
*H04L 29/12*    (2006.01)

(52) U.S. Cl.
CPC .......... *H04L 29/12047* (2013.01); *H04L 61/15* (2013.01)
USPC ............ 370/252; 370/392; 370/401; 709/245

(58) Field of Classification Search
None
See application file for complete search history.

(56) References Cited

U.S. PATENT DOCUMENTS

| 2008/0110359 | A1 | 5/2008 | Oikawa | |
|---|---|---|---|---|
| 2008/0159312 | A1* | 7/2008 | Tuononen et al. | 370/401 |
| 2009/0201834 | A1* | 8/2009 | Xu | 370/254 |
| 2010/0208742 | A1* | 8/2010 | Kafle et al. | 370/401 |
| 2010/0316054 | A1* | 12/2010 | Xu et al. | 370/392 |

(Continued)

FOREIGN PATENT DOCUMENTS

| CN | 101119312 A | 2/2008 |
|---|---|---|
| CN | 101123536 A | 2/2008 |
| CN | 101656765 A | 2/2010 |

OTHER PUBLICATIONS

Charles Perkins et al, Route Optimization in Mobile IP, Mobile IP Working Group Internet Draft, Sep. 6, 2001.

(Continued)

*Primary Examiner* — Hassan Phillips
*Assistant Examiner* — Duc Duong
(74) *Attorney, Agent, or Firm* — Banner & Witcoff, Ltd.

(57) ABSTRACT

The present invention discloses a name-to-address mapping system in a locator and identifier separation network. The system includes mapping nodes and access service nodes connected to each other through the network. The mapping node includes a transceiver module, a first storing module, a node determining module, a second storing module, and an address inquiring module. The present invention also discloses the corresponding method. In the present invention, the one-hop Distributed Hash Table (DHT) algorithm is used to generate a node routing table and a local mapping table whose performances are greatly improved when compared with the Content Addressable Network (CAN) algorithm, thus the phenomenon of the non-uniform distribution of mapping relations in mapping nodes caused by the operators assigning identities section-by-section can be avoided.

15 Claims, 3 Drawing Sheets

(56) References Cited

U.S. PATENT DOCUMENTS

2011/0107420 A1\* 5/2011 Eriksson .......................... 726/22
2012/0002600 A1\* 1/2012 He et al. ........................ 370/328

OTHER PUBLICATIONS

International Search Report for PCT/CN2010/073874 dated Sep. 16, 2010.

\* cited by examiner

US 8,830,857 B2

NAME-TO-ADDRESS MAPPING SYSTEM, DATA TRANSMISSION METHOD AND NAME-TO-ADDRESS MAPPING MAINTENANCE METHOD

TECHNICAL FIELD

The present invention relates to the locator and identifier separation technology, and more especially, to a name-to-address mapping system, a data transmission method and a name-to-address mapping maintenance method in a locator and identifier separation network.

BACKGROUND OF THE RELATED ART

In order to address the issues of the ambiguity of the IP address and the rapid capacity expansion of the routing table in the core router node of the internet, the Internet Engineering Task Force (IETF) proposed the locator and identifier separation technology in recent years. Taking the Locator and Identifier Separation Protocol (LISP) proposed by the LISP workshop for example, the Endpoint Identifier (EID) does not participate in the routing of the IP core network, the backbone router can only access to the Routing LOCator (RLOC) of the border access router, while a border router can access to a large number of endpoints, and a mapping plane is individually set to store the corresponding relationship between the EID and the router RLOC. The corresponding border router RLOC needs to be firstly found for the packets sent to the endpoints in the mapping plane, then the packets are routed to the access router in which the destination endpoint is located according to the RLOC. The schematic diagram is shown in FIG. 1, wherein, the Ingress Tunnel Router (ITR) and the Egress Tunnel Router (ETR) are the logical names of the access routers at the sending and receiving ends.

The LISP can greatly reduce the routing table capacity of the node of the IP backbone router, but it leaves the complexity in the mapping plane, which should store all the corresponding relationships between EID-RLOCs. In the LISP+ALT (ALT is the abbreviation of Alternative Topology, indicating an alternative topology scheme) scheme of the IETF, the endpoint is assumed stationary and each endpoint fixedly belongs to a certain access router, so the common IP hop-by-hop routing mode can be used in the mapping plane to finally route to the destination access router. However, the assumption cannot hold in the mobile network, and it is not suitable to solve the problem of the mobile endpoint accessing to the locator and identifier separation network. Luo Hongbin (phonetic) from Beijing Jiaotong University published a paper "A DHT-based Identifier-to-locator Mapping Approach for a Scalable Internet" on the IEEE Website to present a method for constructing a mapping plane by using the content addressable network (CAN) distributed hash table (DHT) algorithm, but since the average number of search hops of the CAN algorithm is $(d/4) \times d^{1/2}$ (CAN uses the Cartesian multi-dimensional space model, wherein, d is the dimension), and the performance is the best when the dimension $d=\ln N$ (N is the number of nodes in the mapping plane). When the number of nodes in the mapping plane is 10,000, searching data in the mapping plane constructed by CAN technology would go through an average of 7 hops, which would introduce more than 1 second delay, the performance is too low, and it does not solve the problem of interworking among multiple operators.

SUMMARY OF THE INVENTION

The problem to be solved by the invention is to provide a name-to-address mapping system and a data transmission method in a locator and identifier separation network to improve routing efficiency.

To solve the above technical problem, the present invention provides a name-to-address mapping system in a locator and identifier separation network, the system comprising mapping nodes and access service nodes which are connected through a network, wherein, the access service node comprises a transceiver module, which is set to: receive messages sent by an endpoint and the mapping nodes; as well as send messages to the endpoint and the mapping nodes;

the mapping node comprises:

a transceiver module, which is set to: receive messages sent by the access service nodes or other mapping nodes than its own; as well as send messages to the access service nodes or other mapping nodes than its own;

a first storing module, which is set to: store a node routing table which reflects corresponding relationship between identifiers and mapping nodes;

a node determining module, which is connected to the transceiver module and the first storing module and is set to: inquire the node routing table to determine the mapping node corresponding to a destination identifier, when the determined mapping node is a mapping node other than its own, notify the transceiver module of the mapping node to forward the messages to the determined mapping node; when the determined mapping node is the current mapping node, notify an address inquiring module;

a second storing module, which is set to: store a local mapping table, and the local mapping table storing mapping relationship between the local identifiers and routing identifiers; and the address inquiring module, which is connected to the second storing module and is set to: inquire the local mapping table according to the destination identifier to acquire an destination routing identifier; notify the transceiver module of the mapping node to send messages to the access service node corresponding to the destination routing identifier.

The transceiver module of the access service node is further set to: send a registration request or a cancellation request to the mapping node, wherein, the request carries the mapping relationship between the identifier to be registered and the routing identifier or the mapping relationship between the identifier to be cancelled and the routing identifier;

the mapping node further comprises an identifier maintaining module connected to the second storing module;

the transceiver module of the mapping node is further set to: receive the registration request or the cancellation request sent by the access service node;

the node determining module is further set to: inquire the node routing table to determine the corresponding mapping node according to the registration request or the cancellation request of the access service node, if the determined mapping node is the current mapping node, notify the identifier maintaining module;

the identifier maintaining module is set to: register the corresponding mapping relationship between the identifier and the routing identifier in the local mapping table or cancel the corresponding mapping relationship between the identifier and the routing identifier.

The address inquiring module is further set to: after acquiring the destination routing identifier, notify the transceiver module to send mapping relationship between the destination identifier and the destination routing identifier to the access service node corresponding to a source routing identifier;

the transceiver module of the mapping node is further set to: send the mapping relationship between the destination identifier and the destination routing identifier to the access service node corresponding to the source routing identifier;

the access service node further comprises a maintaining module, a local cache module connected to the maintaining module as well as an inquiring module connected to the transceiver module of the access service node as well as the local cache module;

the transceiver module of the access service node is further set to: receive the mapping relationship between the destination identifier and the destination routing identifier sent from the mapping node, and notify the maintaining module to store the mapping relationship between the destination identifier and the destination routing identifier in a local cache table; as well as notify the inquiring module when receiving messages sent from the endpoint;

the maintaining module is set to: cache the mapping relationship between the destination identifier and the destination routing identifier into the local cache table;

the local cache module is set to: store the local cache table, and the local cache table stores the mapping relationship between the identifier and the routing identifier;

the inquiring module is set to: when the corresponding destination routing identifier is searched by inquiring the local cache table according to the destination identifier, notify the transceiver module of the access service node to send the message to the corresponding destination access service node; when no corresponding destination routing identifier is searched, notify the transceiver module of the access service node to send the message to the mapping node.

Each access service node is configured with at least one mapping node, if the access service node is configured with more than one mapping node, the transceiver module of the access service node selects a mapping node from the configured mapping nodes in a round-robin selection way, and sends messages to the selected mapping node.

To solve the above technical problem, the invention further provides a data transmission method in a locator and identifier separation network, comprising:

A, a source mapping node receiving a message carrying a destination identifier sent from a source access service node;

B, the source mapping node inquiring a node routing table to determine a destination mapping node in which the destination routing identifier is located, and if the determined mapping node is the current mapping node, the current mapping node is the destination mapping node, proceeding to step D, otherwise proceeding to step C;

C, the source mapping node forwarding the message to the determined destination mapping node, and the destination mapping node receiving the message; and D, the destination mapping node inquiring the local mapping table according to the destination identifier to obtain a destination routing identifier, and sending the message to the destination access service node corresponding to the destination routing identifier.

In step D, after acquiring the destination routing identifier, the destination mapping node sends the mapping relationship between the destination identifier and the destination routing identifier to the source access service node; the source access service node stores the mapping relationship between the destination identifier and the destination routing identifier in the local mapping table;

before the step A, the source access service node, before sending the message to the source mapping node, inquires the local mapping table according to the destination identifier firstly, if the destination routing identifier is found, directly forwards the message to the corresponding destination access service node, otherwise, proceeds to step A.

Each access service node is configured with at least one mapping node, in step A, the source mapping node is selected from more than one configured nodes in a load balancing mode by the source access service node.

The load balancing mode is a round-robin selection mode or a random mode.

The node routing table of the mapping node is generated based on a distributed hash table algorithm, and the node routing table stores the corresponding relationship between the sections of the identifier hash values and mapping nodes.

To solve the above technical problem, the invention further provides a name-to-address mapping maintenance method in a locator and identifier separation network, comprising:

A, the mapping node receiving a registration request or a cancellation request sent from an access service node, wherein, the request carries an endpoint identifier as well as a routing identifier of the access service node;

B, the mapping node inquiring a node routing table to determine a corresponding mapping node, if the determined mapping node is the current mapping node, proceeding to step D, otherwise, proceeding to step C;

C, the mapping node sending the registration request or the cancellation request to the mapping node determined in the step B, and then proceeding to step B; and D, the mapping node registering the corresponding mapping relationship between the identifier and routing identifier in the local mapping table, or canceling the corresponding mapping relationship between the identifier and the routing identifier in the local mapping table.

The node routing table of the mapping node is generated based on a distributed hash table algorithm, and the node routing table stores the corresponding relationship between sections of the identifier hash values and mapping nodes in a mapping plane.

The data transmission method in the locator and identifier separation system as well as the name-to-address mapping system stores the node routing table and the local mapping table in the mapping nodes of the mapping plane in the present invention, wherein, the mapping node can determine the mapping node that stores the name-to-address mapping relationship by inquiring the node routing table, so as to achieve the fast query of the mapping relationship with single hop in the mapping plane, thus improving the routing efficiency. The node routing table and the local mapping table in the present invention are generated with the single hop DHT algorithm, and the performance is greatly improved when compared with the CAN algorithm, and thus the phenomenon of the non-uniform distribution of the mapping relationship in the mapping nodes due to the section-by-section assigning of the identities by the operators can be avoided, moreover, it does not depend on the underlying IP network topology when the local mapping table is inquired, and the user identifier is not needed to be restricted to only be fixed to access to a certain ASN, hence the endpoint mobility can be supported very well. The one hop DHT algorithm described in this patent only needs a one hop for inquiring a given data in a DHT node, that is, using each node to maintain the routing state of all the other nodes, the given node receives a request and directly inquires the local routing table to acquire the destination node in which the data is located.

PREFERRED EMBODIMENTS OF THE PRESENT INVENTION

The main idea of the system and method in the present invention is to use one-hop distributed hash table technology to build the mapping plane of the locator and identifier separation network, the mapping node in the mapping plane stores the node routing table and part of the local mapping table determined based on the node routing table, the mapping node can determine the mapping nodes which store the name (identifier) to address (the routing identifier) mapping relationship by inquiring the node routing table, so as to achieve the fast inquiry of the mapping relationship with one hop in the mapping plane, and improve the routing efficiency.

Figure 1:
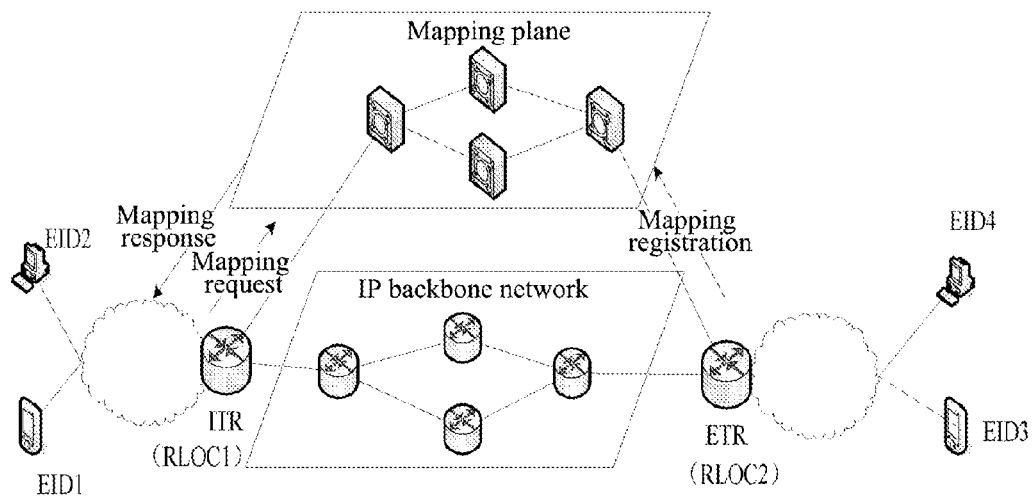
FIG. 1 is a schematic diagram of the architecture of the existing locator and identifier separation network.
Figure 2:
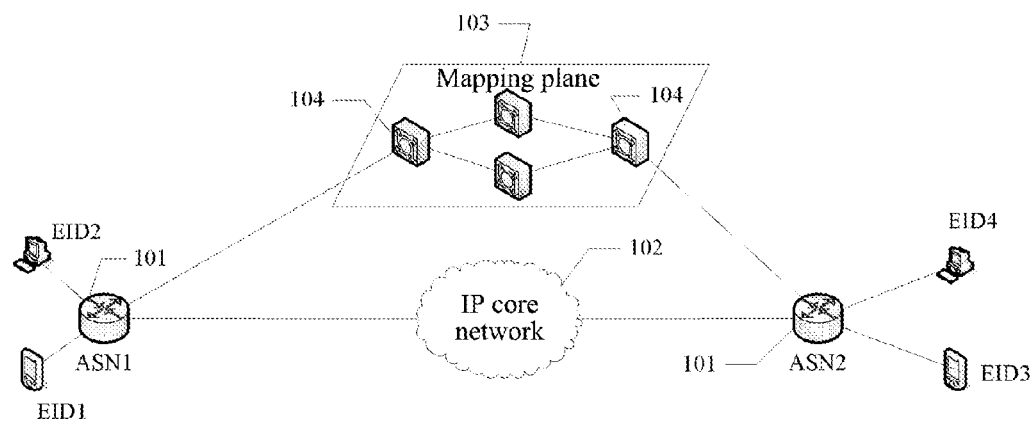
FIG. 2 is a block diagram of a system in the locator and identifier separation network in accordance with the present invention.

FIG. 2 is a structural schematic diagram of the name-to-address mapping system in the locator and identifier separation network in the present invention, and the system comprises the Access Service Node (ASN) 101, the IP core network 102, the mapping plane 103, wherein, the mapping plane 103 consists of at least one mapping node 104.

An ASN can access to multiple endpoints, and each endpoint has a specific identifier, the endpoint communicates with other endpoints through the ASN.

One ASN is configured with at least one mapping node, when it is configured with multiple mapping nodes, the access service node selects one mapping node from the configured mapping nodes with the round-robin selection mode.

Each mapping node stores the node routing table which is used to reflect the corresponding relationship between the identifier and the mapping node, with the node routing table, the mapping node can determine the mapping node in which the mapping relationship between the identifier and the routing identifier is located to achieve inquiring the address with one hop.

In the present invention, the node routing table is generated by using the DHT algorithm, and the node routing table stores the corresponding relationship between the sections of the identifier hash value and the mapping nodes in the mapping plane, and by using the DHT algorithm, the phenomenon of the non-uniform distribution of the mapping relationship in the mapping nodes due to the section-by-section assigning of the identities by the operators can be avoided. The current hash algorithm commonly uses the MD5 or the SHA1, and the hash output is 128 bit or 160 bit data value, in the following to be simple, the 16 bit (that is 0 to 65535) hash value is used to explain the one hop DHT algorithm: if the identifier hash value is 16 bit, then the mapping node in the mapping plane is also assigned with a 16 bit logic node ID; generally, the number of mapping nodes is far fewer than the number of identifier data entries, if one mapping node stores 100 identifier data, the system has a total of 10,000 identifier data, then it only needs 100 mapping nodes. The mapping node in which the identifier data is located is determined by the relationship between the identifier hash value and the node ID, for example, the following simple rules can be used: the identifier is stored in the nearest mapping node whose node ID is greater than or equal to the identifier hash value, for example, the mapping plane has four mapping nodes, whose node IDs are respectively 0, 10000, 30000 and 40000, if the given identifier hash values are 3000 and 16000 respectively, the data should be stored respectively in the mapping nodes whose Node IDs are respectively 10000 and 30000. In order to achieve the one-hop DHT in the present invention, the node routing table of each mapping node stores the ID information of all the mapping nodes, so as to determine the mapping node which stores the data according to the hash value of the destination identifier.

Of course, other rules can also be used to determine the storage relationship, for example, select the storage relationship according to the method of the smallest absolute value of the difference between the identifier hash value and the node ID.

Besides of the node routing table, each mapping node also sets the local mapping table for storing the mapping relationship between the identifier and the routing identifier registered in the current mapping node. No data exchange is needed between different mapping nodes, and the mapping node corresponding to the destination identifier can be determined with up to one hop by inquiring the node routing table, and then the destination routing identifier corresponding to the destination identifier can be acquired in the mapping node.

Preferably, the local mapping table is also generated by using the DHT algorithm. In the mapping nodes, which mapping node the mapping relationship between the identity and the routing identity is stored in the local mapping table of is determined by the DHT algorithm and not dependent on the underlying IP network topology, and it does not need to restrict that the user's EID can only be fixed to access to a certain ASN, hence it can support the endpoint mobility very well.

Figure 3:
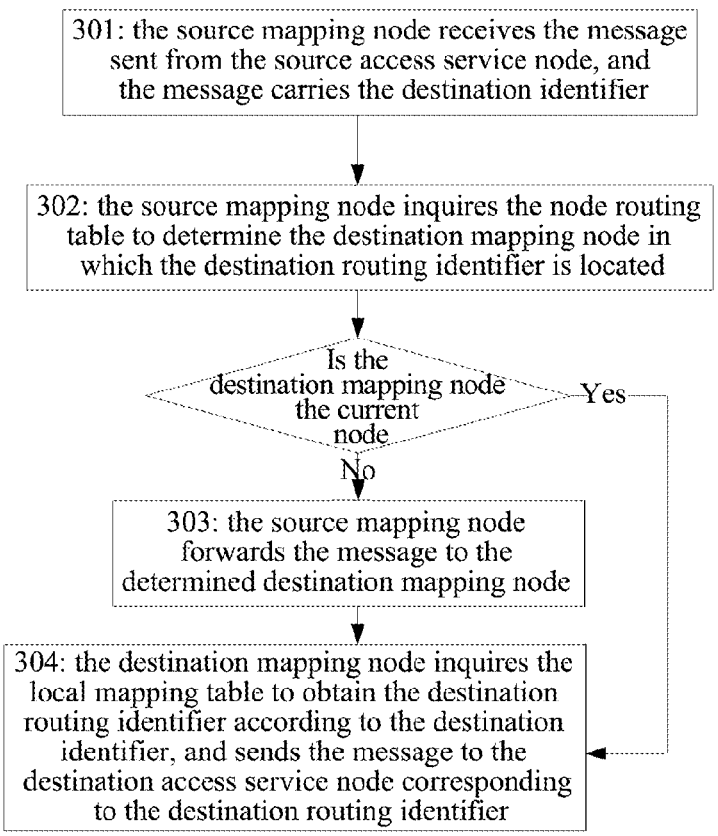
FIG. 3 is a schematic diagram of a data transmission method in the locator and identifier separation network in accordance with the present invention.

The data transmission process achieved based on the above system in accordance with the present invention is shown as FIG. 3, and the process comprises the following steps.

Step 301, a source mapping node receives the message sent from a source access service node, and the message carries a destination identifier.

Each access service node is configured with at least one mapping node, in step 301, the source mapping node is a node selected from the plurality of configured mapping nodes by the source access service node in a round-robin selection way.

Step 302, the source mapping node inquires the node routing table to determine the destination mapping node in which the destination routing identifier is located, if the determined mapping node is the current mapping node, the current mapping node is the destination mapping node, proceed to step 304, otherwise proceed to step 303.

Step 303, the source mapping node forwards the message to the determined destination mapping node, and the destination mapping node receives the message.

Step 304, the destination mapping node inquires the local mapping table to obtain the destination routing identifier according to the destination identifier, and sends the message to the destination access service node corresponding to the destination routing identifier.

In step 304, after the destination mapping node acquires the destination routing identifier, it sends mapping relationship between the destination identifier and the destination routing identifier to the source access service node; the source access service node stores the mapping relationship in the local mapping table; before the step 301, before the source access service node sends the message to the source mapping node, the source access service node firstly inquires the local mapping table according to the destination identifier, if the destination routing identifier is found, directly forwards the message to the corresponding destination access service node, otherwise proceed to step 301.

In the process of maintaining the registration or cancellation of the name-to-address mapping relationship, it may also be achieved with one hop, that is, the mapping node which receives the registration or inquiry request determines the mapping node which should store the mapping relationship to be registered or cancelled by inquiring the node routing table, and sends the registration or cancellation request to the determined mapping node, and then the mapping node fulfills the maintenance of cancellation or registration. Specifically, the method for maintaining the name-to-address mapping relationship in the locator and identifier separation network comprises:

A, the mapping node receiving a registration request or a cancellation request sent from the access service node, and the registration request or the cancellation request carrying the endpoint identifier as well as the routing identifier of the access service node;

B, the mapping node inquiring the node routing table to determine the corresponding mapping node, if the determined mapping node is the current mapping node, proceeding to step D, otherwise proceeding to step C;

C, the mapping node sending the registration or cancellation request to the mapping node determined in the step B, and then proceeding to step B;

D, the mapping node registering or canceling the mapping relationship between the corresponding identifier and the routing identifier in the local mapping table.

In the following, the present invention will be described in further detail with combination of the accompanying figures and the specific application examples.

Application example one

Figure 4:
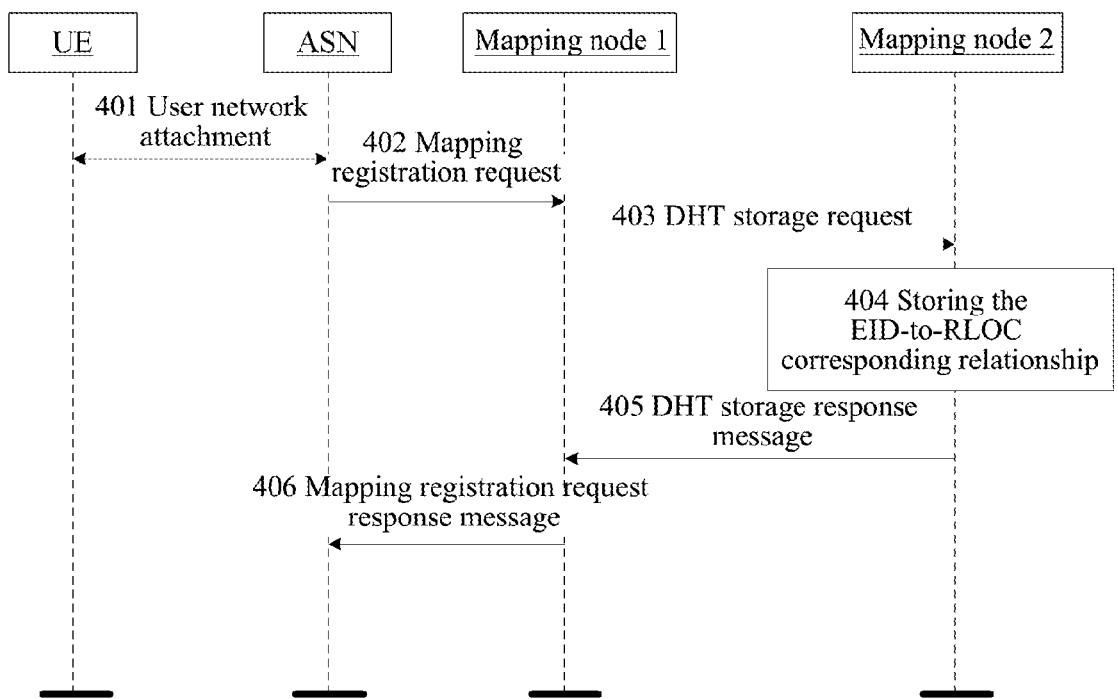
FIG. 4 is a flow chart of registering the mapping relationship in accordance with the application example one in the present invention.

FIG. 4 shows the process of a user equipment (UE) registering the name-to-address mapping relationship to the mapping node in the mapping plane when the UE attaches to the network, the process comprising the following steps.

Step 401, the UE registers to the ASN. The registration process uses the existing process; for example, the ASN is a 3GPP network access gateway, and then it uses 3GPP packet domain user attachment process.

Step 402, after the ASN processed the UE network attachment request, the ASN sends a Map_register request to the mapping plane, and the request carries the UE identifier and the routing identifier of the ASN.

Generally speaking, each ASN can configure the addresses of multiple mapping nodes of the mapping plane, and the ASN can send a request to a plurality of mapping nodes in a round-robin selection way so as to achieve the purpose of load balancing.

Step 403, the mapping node 1 inquires the node routing table according to the UE identifier, and acquires that the identifier should be stored in the mapping node 2, and then sends a DHT storage request to the mapping node 2 to request for storing the corresponding relationship between the UE identifier and the ASN routing identifier.

When using the one hop DHT, the node routing table actually stores the information of all the mapping nodes in the mapping plane. For simplicity, it is assumed that the length of the node ID is 16 bit (it is generally 128 bit or above in the actual network), which is indicated as follows:

| Node ID | Node IP address | Node port number | Node state |
|---------|----------------|------------------|-----------|
| 0x0100  | 10.1.1.1       | 7090             | Active    |
| 0x0d00  | 10.9.8.5       | 7090             | Active    |
| 0x8200  | 10.24.3.2      | 7090             | Active    |
| ...     | ...            | ...              | ...       |

Given an identifier, the identifier is firstly hashed to acquire a 16 bit identifier hash value which is assumed as 0x3012 before the node routing table is inquired. In the above node routing table example, 0x8200 node ID is the minimum node ID that is greater than or equals to the value, so the identifier data is stored in the mapping node corresponding to the 0x8200 node ID.

Step 404, after receiving a mapping storage request, the mapping node 2 locally stores the corresponding relationship between the UE identifier and the ASN routing identifier.

In this step, the mapping node 2 might backup the piece of data to one or more other nodes based on the backup strategy of the DHT algorithm.

Step 405, the mapping node 2 returns the DHT storage response message to the mapping node 1.

Step 406, the mapping node 1 returns the Map_Register response message to the ASN, and the embodiment is completed.

Application example two

Figure 5:
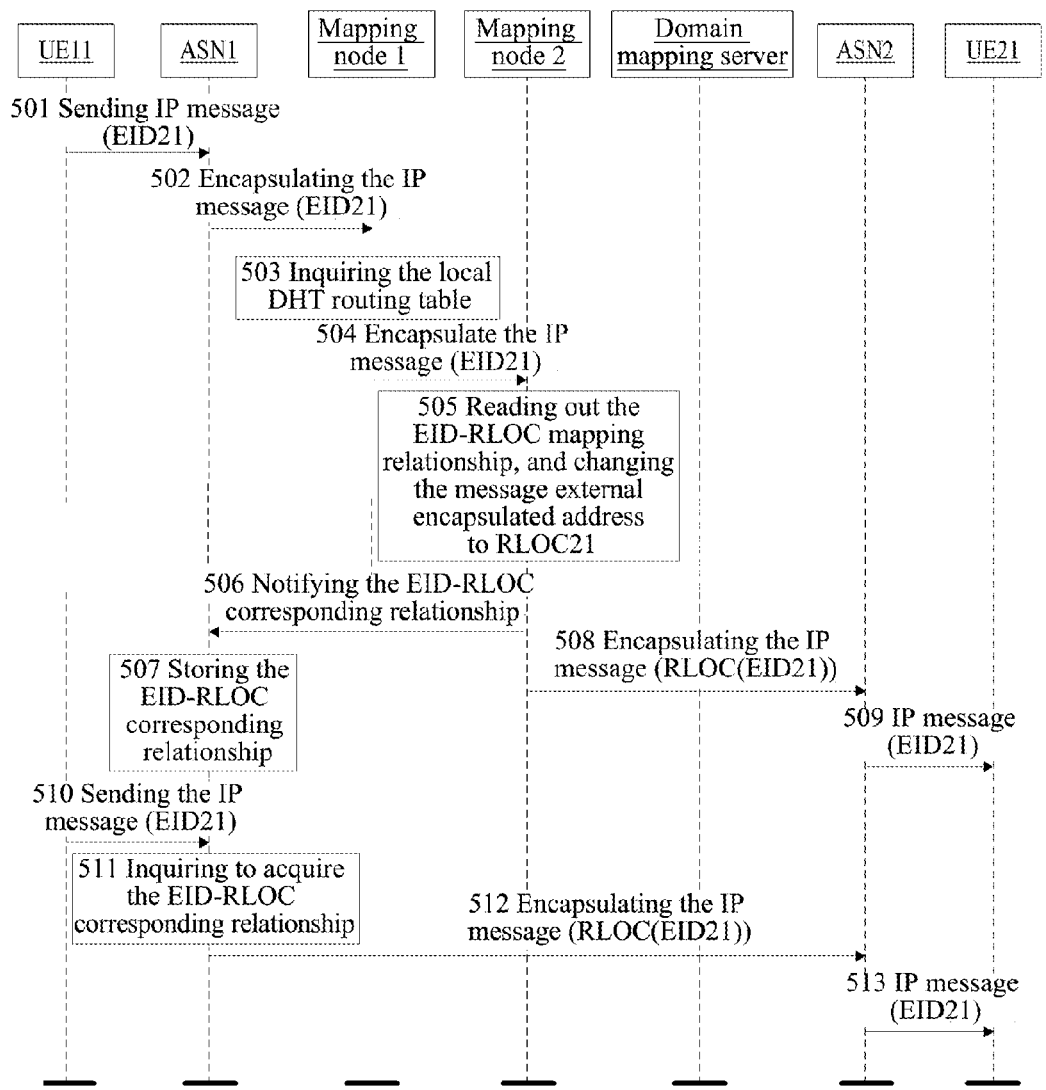
FIG. 5 is a flow chart of implementing IP communication in the mapping plane in accordance with the application example two in the present invention.

FIG. 5 shows the process for implementing the IP communications in the mapping plane, comprising the following steps.

Step 501, UE11 sends an IP message whose destination address is the UE21 identifier EID21.

Step 502, after the ASN1 receives the message, it cannot find the EID21 record in the local identifier-to-routing identifier mapping cache table, encapsulates and sends the message to the mapping node 1 in the mapping plane, its encapsulated message external address is the IP address of the mapping node 1.

As to the selection of the mapping nodes, the static configuration method can be used. For example, multiple mapping nodes can be configured in the ASN, and for each request sent to the mapping plane, the ASN selects in the plurality of mapping nodes in the load balancing mode such as the round-robin selection way.

Step 503, after receiving the message, the mapping node 1 takes the EID21 as a keyword to inquire the node routing table and knows that the data is stored in the mapping node 2.

Step 504, according to the inquiry result, the mapping node 1 forwards the message to the mapping node 2.

Step 505, the mapping node 2 reads the local mapping table to acquire the RLOC21 (ASN2 routing identifier) corresponding to the EID21, and change the external encapsulated destination address of the received IP packet to RLOC21.

Steps 506-507, the mapping node 2 notifies the ASN1 of the EID21-RLOC21 corresponding relationship, and the ASN1 stores the corresponding relationship in its own local cache so that the IP messages subsequently sent to the EID21 can be directly matched to the record locally and does not need to be forwarded via the mapping plane.

Step 508, the mapping node 2 sends the message whose encapsulation address is changed to the ASN2 corresponding to the RLOC21.

The orders of step 506 and step 508 can be changed.

Step 509, after the ASN2 receives the message, the ASN2 removes the external encapsulated header, and sends the message to the UE21, thus fulfills an end to end message transmission.

Step 510, the UE11 further sends a message whose destination address is EID21.

Step 511, after the ASN1 receives the message, it inquires in the local cache to acquire the routing identifier RLOC21 corresponding to the EID21, and encapsulates the message. Wherein, the encapsulated destination address is RLOC21, the source address is the RLOC11 of the ASN.

Step 512, the ASN1 directly sends the message encapsulated in the previous step to the ASN2, and it does not need to be done through the mapping plane again.

Step 513, after the ASN2 receives the message sent from the ASN1, the ASN2 removes the external encapsulated header, and forwards the message to the UE21.

To achieve the above method, the present invention also provides a name-to-address mapping system in the locator and identifier separation network, and the name-to-address mapping system comprises mapping nodes and access service nodes that are connected through a network.

The access service node comprises a transceiver module, a maintaining module, and a local cache module connected to the maintaining module, as well as an inquiring module connected to the transceiver module and the local cache module, wherein, the transceiver module is used to receive messages sent by the endpoint and the mapping nodes, and notify the inquiring module when receiving the message from the endpoint; the transceiver module is also used to send messages to the endpoint and the mapping nodes; and also used to receive the mapping relationship sent by the mapping node, and notify the maintaining module to store the mapping relationship into the local cache table; and also used to send a registration or cancellation request to the mapping mode, and the request carries mapping relationship to be registered or cancelled between the identifier and the routing identifier;

each access service node is configured with at least one mapping node, if the access service node is configured with more than one mapping node, the transceiver module of the access service node selects a mapping node from the configured mapping nodes in the load balancing mode such as a round-robin selection way or a random mode, and send messages to the selected mapping node.

The maintaining module is set to cache the mapping relationship into the local cache table;

the local cache module is set to store the local cache table, and the local cache table stores the mapping relationship between the identifier to the routing identifier;

the inquiring module is set to inquire the local cache table according to the destination identifier, when the corresponding destination routing identifier is found, notify the transceiver module to send the message to the corresponding destination access service node; otherwise, notify the transceiver module to send the message to the mapping node.

The mapping node comprises a transceiver module, a first storing module, a node determining module connected to the transceiver module and the first storing module, a second storing module, and an address inquiring module connected to the transceiver module, the node determining module and the second storing module, and an identifier maintaining module connected to the second storing module, wherein, the transceiver module is used to receive messages sent by the access service nodes or other mapping nodes; as well as send messages to the access service nodes or other mapping nodes; the transceiver module is further used to receive the registration request or cancellation request sent from the access service node; and is further used to send the mapping relationship to the access service node corresponding to the source routing identifier;

the first storing module is used to store the node routing table which reflects the corresponding relationship between the identifiers and the mapping nodes; specifically, the corresponding relationship might be the corresponding relationship between the sections of the identifier hash value and the mapping nodes;

the routing maintaining module is used to maintain the node routing table, and is responsible to change the corresponding node routing table when there is a new mapping node joining in the mapping plane or quitting from the mapping plane;

the node determining module is used to inquire the node routing table to determine the mapping node corresponding to the destination identifier, when the determined mapping node is a mapping node other than its own, notify the transceiver module to forward the message to the determined mapping node; when the determined mapping node is the current mapping node, notify the address inquiring module; and also used to inquire the node routing table to determine the corresponding mapping node according to the registration request or the cancellation request of the access service node, if the determined mapping node is the current mapping node, notify the identifier maintaining module;

the address inquiring module is used to inquire a local mapping table according to the destination identifier to acquire the destination routing identifier; and also used to notify the transceiver module to send messages to the access service node corresponding to the destination routing identifier; after acquiring the destination routing identifier, the address inquiring module is further used to notify the transceiver module to send the mapping relationship between the destination identifier and the destination routing identifier to the access service node corresponding to the source routing identifier;

the second storing module is used to store the local mapping table, and the local mapping table stores the mapping relationship between the local identifier and the routing identifier;

the identifier maintaining module is used to register or cancel the corresponding mapping relationship between the identifier and the routing identifier in the local mapping table.

The data transmission method in the locator and identifier separation system as well as the name-to-address mapping system stores the node routing table and the local mapping table in the mapping nodes of the mapping plane in the present invention, and the mapping node can determine the mapping node that stores the name-to-address mapping relationship by inquiring the node routing table, so as to achieve the fast inquiry of the mapping relationship with single hop in the mapping plane and to improve the routing efficiency. The node routing table and the local mapping table in the present invention are generated with the one hop DHT algorithm, and the performance is greatly improved compared with the CAN algorithm, thus the phenomenon of the non-uniform distribution of the mapping relationship in the mapping nodes due to the section-by-section assigning of the identities by the operators can be avoided. Moreover, it does not depend on the underlying IP network topology when the local mapping table is inquired, and it does not need to restrict that the user identifier can only be fixed to access to a certain ASN, hence it can support the endpoint mobility very well.

It can be understood by those skilled in the art that some or all steps in the abovementioned method can be fulfilled by relevant hardware components instructed with a program, and the program may be stored in a computer readable storage media such as read only memory, magnetic disk or optical disk and so on. Optionally, all or some steps of the aforementioned embodiment can be implemented with one or more integrated circuits. Correspondingly, each module/unit in the aforementioned embodiment can be implemented in the form of hardware or software function module. The present invention does not restrict any combination of specific hardware and software forms.

Industrial Applicability

The node routing table and the local mapping table in the present invention are generated with the one hop DHT algorithm, and the performance is greatly improved when compared with the CAN algorithm, thus the phenomenon of the uneven distribution of the mapping relationship in the mapping nodes due to the section-by-section assigning of the identities by the operators can be avoided, moreover, it does not depend on the underlying IP network topology when the local mapping table is inquired, and it does not need to restrict that the user identifier can only be fixed to access to a certain ASN, hence it can support the endpoint mobility very well.

What is claimed is:

1. A name-to-address mapping system in a locator and identifier separation network, the system comprising mapping nodes and access service nodes which are connected through a network, wherein, the access service node comprises a transceiver module, which is set to: receive messages sent by an endpoint and the mapping nodes; as well as send messages to the endpoint and the mapping nodes;

the mapping node comprises:

a transceiver module, which is set to: receive messages sent by the access service nodes or other mapping nodes than its own; as well as send messages to the access service nodes or other mapping nodes than its own;

a first storing module, which is set to: store a node routing table which reflects corresponding relationships between identifiers and mapping nodes;

a node determining module, which is connected to the transceiver module and the first storing module and is set to: inquire the node routing table to determine the mapping node corresponding to a destination identifier, when the determined mapping node is a mapping node other than its own, notify the transceiver module of the mapping node to forward the messages to the determined mapping node; when the determined mapping node is the current mapping node, notify an address inquiring module;

a second storing module, which is set to: store a local mapping table, and the local mapping table storing mapping relationships between the local identifiers and routing identifiers; and the address inquiring module, which is connected to the second storing module and is set to: inquire the local mapping table according to the destination identifier to acquire a destination routing identifier; and notify the transceiver module of the mapping node to send messages to the access service node corresponding to the destination routing identifier.

2. The system of claim 1, wherein, the transceiver module of the access service node is further set to: send a registration request or a cancellation request to the mapping node, wherein, the request carries the mapping relationship between the identifier to be registered and the routing identifier or the mapping relationship between the identifier to be cancelled and the routing identifier;

the mapping node further comprises an identifier maintaining module connected to the second storing module;

the transceiver module of the mapping node is further set to: receive the registration request or the cancellation request sent by the access service node;

the node determining module is further set to: inquire the node routing table to determine the corresponding mapping node according to the registration request or the cancellation request of the access service node, if the determined mapping node is the current mapping node, notify the identifier maintaining module;

the identifier maintaining module is set to: register the corresponding mapping relationship between the identifier and the routing identifier in the local mapping table or cancel the corresponding mapping relationship between the identifier and the routing identifier.

3. The system of claim 1, wherein, the address inquiring module is further set to: after acquiring the destination routing identifier, notify the transceiver module to send mapping relationship between the destination identifier and the destination routing identifier to the access service node corresponding to a source routing identifier;

the transceiver module of the mapping node is further set to: send the mapping relationship between the destination identifier and the destination routing identifier to the access service node corresponding to the source routing identifier;

the access service node further comprises a maintaining module, a local cache module connected to the maintaining module as well as an inquiring module connected to the transceiver module of the access service node as well as the local cache module;

the transceiver module of the access service node is further set to: receive the mapping relationship between the destination identifier and the destination routing identifier sent from the mapping node, and notify the maintaining module to store the mapping relationship between the destination identifier and the destination routing identifier in a local cache table; as well as notify the inquiring module when receiving messages sent from the endpoint;

the maintaining module is set to: cache the mapping relationship between the destination identifier and the destination routing identifier into the local cache table;

the local cache module is set to: store the local cache table, and the local cache table stores the mapping relationship between the identifier and the routing identifier;

the inquiring module is set to: when the corresponding destination routing identifier is searched by inquiring the local cache table according to the destination identifier, notify the transceiver module of the access service node to send the message to the corresponding destination access service node; when no corresponding destination routing identifier is searched, notify the transceiver module of the access service node to send the message to the mapping node.

4. The system of claim 3, wherein, each access service node is configured with at least one mapping node, if the access service node is configured with more than one mapping node, the transceiver module of the access service node selects a mapping node from the configured mapping nodes in a round-robin or random selection way, and sends messages to the selected mapping node.

5. The system of claim 1, wherein, each access service node is configured with at least one mapping node, if the access service node is configured with more than one mapping node, the transceiver module of the access service node selects a mapping node from the configured mapping nodes in a round-robin selection way, and sends messages to the selected mapping node.

6. A data transmission method in a locator and identifier separation network, comprising:
  A, a source mapping node receiving a message carrying a destination identifier sent from a source access service node;
  B, the source mapping node inquiring a node routing table to determine a destination mapping node in which the destination routing identifier is located, and if the determined mapping node is the current mapping node, the current mapping node is the destination mapping node, proceeding to step D, otherwise proceeding to step C;
  C, the source mapping node forwarding the message to the determined destination mapping node, and the destination mapping node receiving the message; and
  D, the destination mapping node inquiring a local mapping table according to the destination identifier, obtaining a destination routing identifier, and sending the message to the destination access service node corresponding to the destination routing identifier;
  wherein, the node routing table of the mapping node is generated based on a distributed hash table algorithm, and the node routing table stores the corresponding relationship between the sections of the identifier hash values and mapping nodes.

7. The method of claim 6, wherein,
in step D, after acquiring the destination routing identifier, the destination mapping node sends the mapping relationship between the destination identifier and the destination routing identifier to the source access service node; the source access service node stores the mapping relationship between the destination identifier and the destination routing identifier in the local mapping table;
before the step A, the source access service node, before sending the message to the source mapping node, inquires the local mapping table according to the destination identifier firstly, if the destination routing identifier is found, directly forwards the message to the corresponding destination access service node, otherwise, proceeds to step A.

8. The method of claim 7, wherein, each access service node is configured with at least one mapping node, in step A, the source mapping node is selected from more than one configured nodes in a load balancing mode by the source access service node.

9. The method of claim 8, wherein, the load balancing mode is a round-robin selection mode or a random mode.

10. The method of claim 7, wherein, the node routing table of the mapping node is generated based on a distributed hash table algorithm, and the node routing table stores the corresponding relationship between the sections of the identifier hash values and mapping nodes.

11. The method of claim 6, wherein, each access service node is configured with at least one mapping node, in step A, the source mapping node is selected from more than one configured nodes in a load balancing mode by the source access service node.

12. The method of claim 11, wherein, the load balancing mode is a round-robin selection mode or a random mode.

13. A name-to-address mapping maintenance method in a locator and identifier separation network, comprising:
  A, a mapping node receiving a registration request or a cancellation request sent from an access service node, wherein, the request carries an endpoint identifier as well as a routing identifier of the access service node;
  B, the mapping node inquiring a node routing table to determine a corresponding mapping node, if the determined mapping node is the current mapping node, proceeding to step D, otherwise, proceeding to step C;
  C, the mapping node sending the registration request or the cancellation request to the mapping node determined in the step B, and then proceeding to step B; and
  D, the mapping node registering the corresponding mapping relationship between the identifier and routing identifier in the local mapping table, or canceling the corresponding mapping relationship between the identifier and the routing identifier in the local mapping table.

14. The method of claim 13, wherein, the node routing table of the mapping node is generated based on a distributed hash table algorithm, and the node routing table stores the corresponding relationship between sections of the identifier hash values and mapping nodes in a mapping plane.

15. The system of claim 2, wherein, each access service node is configured with at least one mapping node, if the access service node is configured with more than one mapping node, the transceiver module of the access service node selects a mapping node from the configured mapping nodes in a round-robin or random selection way, and sends messages to the selected mapping node.

* * * * *